(12) United States Patent
Banga et al.

(10) Patent No.: US 9,454,735 B2
(45) Date of Patent: Sep. 27, 2016

(54) INTEGRATING DATA WITH A CONTACT

(75) Inventors: Gaurav Banga, Cupertino, CA (US);
Saurabh Aggarwal, Delhi (IN);
Woodson Hobbs, Menlo Park, CA (US)

(73) Assignee: NOKIA CORPORATION, Espoo (FI)

( * ) Notice: Subject to any disclaimer, the term of this patent is extended or adjusted under 35 U.S.C. 154(b) by 1653 days.

(21) Appl. No.: 11/479,744

(22) Filed: Jun. 30, 2006
(Under 37 CFR 1.47)

(65) Prior Publication Data
US 2008/0256107 A1 Oct. 16, 2008

Related U.S. Application Data

(60) Provisional application No. 60/720,772, filed on Sep. 26, 2005.

(51) Int. Cl.
| | | |
|---|---|---|
| H04M 3/42 | (2006.01) | |
| G06Q 10/00 | (2012.01) | |
| H04L 12/58 | (2006.01) | |
| H04M 1/2745 | (2006.01) | |
| H04M 1/725 | (2006.01) | |

(52) U.S. Cl.
CPC .............. G06Q 10/00 (2013.01); H04L 12/587 (2013.01); H04L 12/589 (2013.01); H04L 51/24 (2013.01); H04L 51/36 (2013.01); H04M 3/42374 (2013.01); H04L 12/581 (2013.01); H04L 51/04 (2013.01); H04M 1/2745 (2013.01); H04M 1/72547 (2013.01); H04M 2207/18 (2013.01)

(58) Field of Classification Search
CPC ... G06Q 10/00; H04L 12/581; H04L 12/587; H04L 12/589; H04L 51/04; H04L 51/24; H04L 51/36; H04M 1/2745; H04M 1/72547; H04M 3/42374; H04M 2207/18

USPC ........................................................ 455/414.1
See application file for complete search history.

(56) References Cited

U.S. PATENT DOCUMENTS

| | | | | |
|---|---|---|---|---|
| 6,720,863 | B2 * | 4/2004 | Hull et al. | 340/7.51 |
| 2003/0065721 | A1 * | 4/2003 | Roskind | 709/204 |
| 2003/0210265 | A1 * | 11/2003 | Haimberg | 345/758 |
| 2004/0019912 | A1 * | 1/2004 | Staack | 725/109 |
| 2005/0055639 | A1 * | 3/2005 | Fogg | 715/535 |
| 2005/0083851 | A1 * | 4/2005 | Fotsch | 370/252 |
| 2005/0198125 | A1 * | 9/2005 | Macleod Beck et al. | 709/204 |
| 2006/0031370 | A1 * | 2/2006 | Lyle et al. | 709/207 |
| 2006/0035632 | A1 * | 2/2006 | Sorvari et al. | 455/418 |
| 2006/0047617 | A1 * | 3/2006 | Bacioiu et al. | 706/59 |
| 2006/0085752 | A1 * | 4/2006 | Beadle et al. | 715/751 |
| 2006/0101119 | A1 * | 5/2006 | Qureshi et al. | 709/206 |
| 2006/0270461 | A1 * | 11/2006 | Won et al. | 455/566 |
| 2006/0288077 | A1 * | 12/2006 | Chen | 709/206 |

FOREIGN PATENT DOCUMENTS

| | | |
|---|---|---|
| WO | WO-99/34628 | 7/1999 |
| WO | WO 9934628 A1 * | 7/1999 |

* cited by examiner

*Primary Examiner* — Ajit Patel
(74) *Attorney, Agent, or Firm* — Ditthavong & Steiner, P.C.

(57) ABSTRACT

A system and method for integrating data with a contact is disclosed. The technology initially receives a first data element from a contact and provides a representation of the first data element. The representation of the first data element is then coupled with the contact on a contact list. A second data element is then received from the contact and a representation of the second data element received is also provided. The representation of the second data element is then coupled with the contact on the contact list, such that the representation of the first data element and the representation of the second data element are concurrently coupled with the contact on the contact list.

41 Claims, 8 Drawing Sheets

INTEGRATING DATA WITH A CONTACT

CROSS REFERENCE TO RELATED APPLICATIONS

This patent application claims the benefit of the co-pending U.S. Provisional Patent Application No. 60/720,772 entitled "UNIFIED MESSAGING, AN AUTOMATIC PRESENCE MANAGEMENT SYSTEM, AND PROPAGATION AND DISTRIBUTION OF PRESENCE STATUS UPDATES" by Gaurav Banga et al., filed Sep. 26, 2005, which was assigned to the assignee of the present invention, the disclosure of which is hereby incorporated by reference.

FIELD OF THE INVENTION

Embodiments described herein pertain to data organization and more specifically to a method and system for integrating data with a contact.

BACKGROUND

Wireless personal devices such as mobile phones, electronic mail (email) devices, and converged personal digital assistant/phones (also known as "smart phones") have greatly improved the ability of people to contact business associates, friends and family, and automated information technology (IT) systems. A person carrying such a device (a "mobile person") can be contacted virtually anytime and anywhere.

There are many different communication methods available to communicate with a "mobile person." These methods include voice telephony, SMS (short messaging service), MMS (multimedia messaging service), email, text messages, chat, voice-over-IP (Internet Protocol), push-to-talk, fax and the like. In a typical implementation, these communication methods are "instant;" in other words, they allow the originator of the communication to reach the recipient of the communication in "real-time," with little or no delay.

Real-time instant communication of this type can be a dual-edged sword. On one hand, real-time communication greatly increases the ability of people to communicate. On the other hand, it opens up issues of privacy and distraction. Simply put, many people do not want to be reachable by all people all the time. However, this situation can be complicated by the fact that many "mobile persons" need or want to be available to certain groups of people (including people they do not know) virtually all the time.

In other words, mobile persons have limited mechanisms to control who can communicate with them and when, and at what times. This problem can be referred to as "a total availability problem."

Another problem with mobile messaging is that it does not succeed in replicating, for example, a personal computer (PC) type of environment, where a person is able to switch relatively easily and seamlessly between different applications. In other words, a mobile person may receive voice mail, email, text messages and the like. Presently, each of these messages is displayed in different methods and one message can be easily overlooked when a mobile person is focusing on another message.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, a system and method for integrating data with a contact is disclosed. The technology initially receives a first data element from a contact and provides a representation of the first data element. The representation of the first data element is then coupled with the contact on a contact list. A second data element is then received from the contact and a representation of the second data element received is also provided. The representation of the second data element is then coupled with the contact on the contact list, such that the representation of the first data element and the representation of the second data element are concurrently coupled with the contact on the contact list.

DESCRIPTION OF THE DRAWINGS

The accompanying drawings, which are incorporated in and form a part of this specification, illustrate embodiments of the technology for integrating data with a contact and, together with the description, serve to explain principles discussed below.

The drawings referred to in this description should be understood as not being drawn to scale except if specifically noted.

DETAILED DESCRIPTION

Reference will now be made in detail to embodiments of the present technology for integrating data with a contact, examples of which are illustrated in the accompanying drawings. While the technology for integrating data with a contact will be described in conjunction with various embodiments, it will be understood that they are not intended to limit the present technology for integrating data with a contact to these embodiments. On the contrary, the presented technology for integrating data with a contact is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for integrating data with a contact. However, the present technology for integrating data with a contact may be practiced without these specific details. In other instances, well known methods, procedures, components, and circuits have not been described in detail as not to unnecessarily obscure aspects of the present embodiments.

Unified Messaging™ Overview

In one embodiment, the present technology provides an integrated mobile messaging interface for presenting data integrated from a plurality of applications. For example, embodiments of the present invention pertain to an integrated mobile messaging solution—referred to herein as "Unified Messaging™"—that supports communication protocols including voicemail, email, SMS (short messaging service), MMS (multimedia messaging service), text message, instant messaging (IM), personal information management (PIM) data (e.g., calendar, contacts, and tasks), and mobile data access, in one application, making a wireless personal device (a "mobile device") a suitable replacement for a PC or similar device for mobile persons.

Although the embodiments described herein specifically refer to mobile devices, the present invention is well suited to use with various other devices not typically thought of as mobile. Such as, for example, mounted navigation systems, in-dash computing devices, heads-up display systems, and the like.

In general, users of the Unified Messaging™ application can jump between applications, using the information and metadata from one application in another application, without having to manually transfer information between the two applications. Individual messaging capabilities are built on top of a unified data model and application infrastructure, and work in concert to readily and securely deliver information to the user.

Moreover, in one embodiment, Unified Messaging™ described herein also perform data collection and correlation. In general, data collection and correlation is the ability for a user to see information relating to a contact in one location. For example, in one view, the user can see how many emails, voicemails, or other messages they have received from (or sent to) a particular contact. Additionally, the user may then be able to access that contact readily from the same user interface. In other words, the contact's address, phone number, and instant messaging identity (ID) or the like are also available.

Unified Messaging™ Operation

Figure 1:
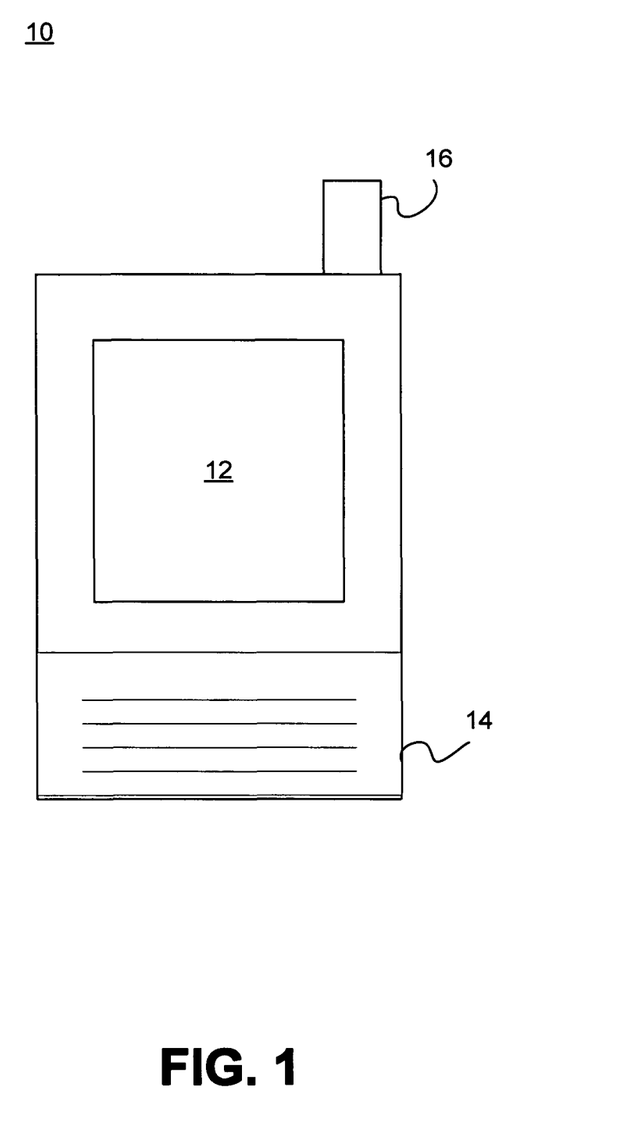
FIG. 1 illustrates an exemplary device upon which embodiments in accordance with the present invention may be implemented.

With reference now to FIG. 1, an exemplary wireless personal device 10, upon which embodiments the present invention may be implemented, is shown. In the present embodiment, device 10 includes a display 12, a keyboard 14 and an antenna 16. In one embodiment, device 10 may be a wireless personal device such as a mobile phone, a personal digital assistant (PDA), a digital video player, a digital audio player, an MP3 player, a palmtop device, a positioning system receiver and the like. Although FIG. 1 illustrates an exemplary wireless personal device, embodiments described herein are also well suited for operation on a larger device such as a laptop computer, and the like.

Figure 2:
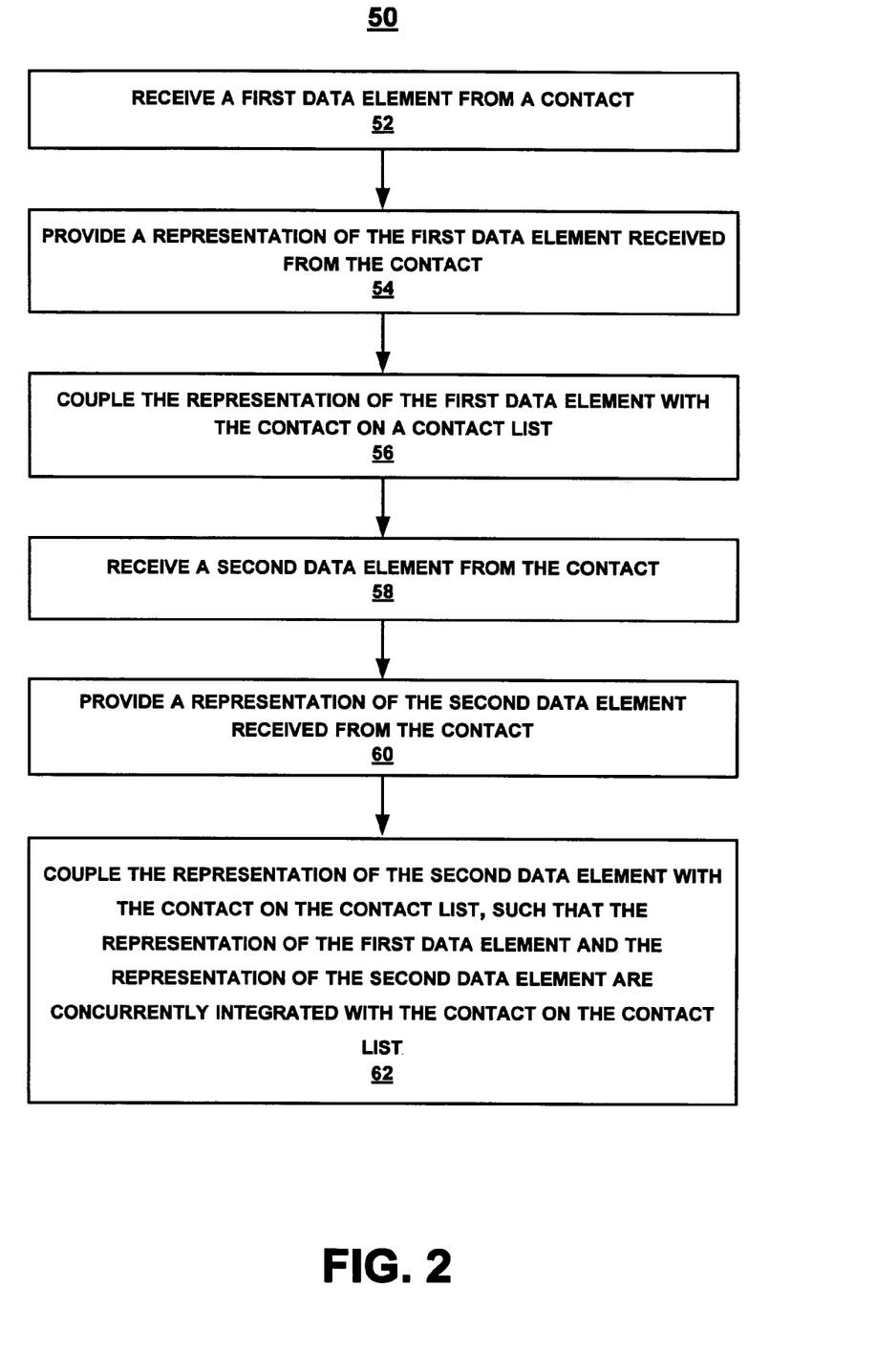
FIG. 2 is a flowchart of a method presenting data integrated from a plurality of applications according to one embodiment of the present invention.

With reference now to FIG. 2, a flowchart of a method for integrating data with a contact is described in accordance with an embodiment of the present invention. In general, the integrated mobile messaging solution provides support for communication methods including voicemail, email, SMS, MMS, text messaging, personal information management (PIM) data (e.g., calendar, contacts, and tasks), mobile data access and the like, in one unified application.

Moreover, Unified Messaging™ provides these different types of communication methods accessible on a single interface, on various types of mobile devices at virtually any location. In one embodiment, the various communication (messaging) methods also include "one-touch" access. In other words, users can access email, instant messaging (on any IM network), text/SMS messages, the Web, voice communications, contacts, calendar information, and more, from a single mobile device screen.

Figure 3:
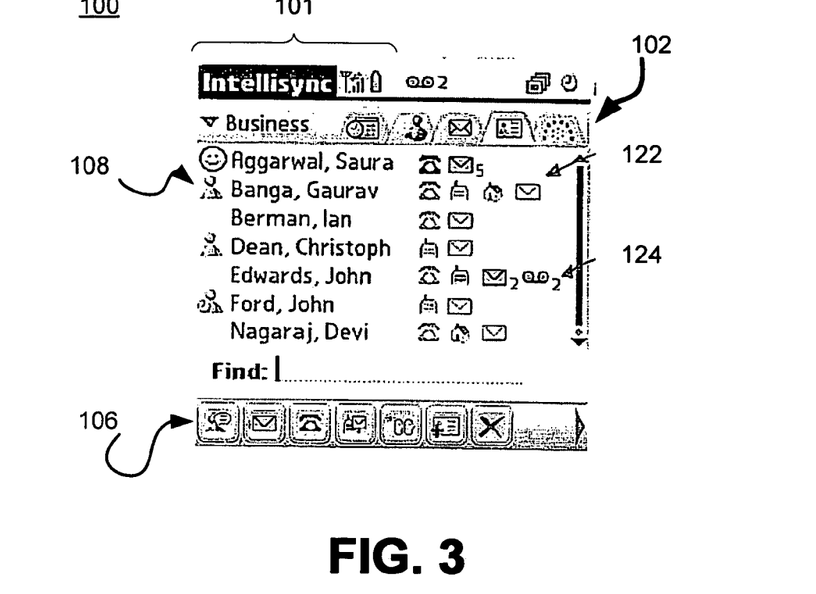
FIG. 3 is an exemplary user interface having a contact list with associated data elements according to one embodiment of the present invention.

With reference now to 52 of FIG. 2 and to FIG. 3, one embodiment receives a first data element from a contact 108. In one embodiment, the first data element may be an email, instant message (IM), short message service (SMS), text message, web access, voice mail, address book, calendar, tasks, notes, BOT buddies, pages, corporate IM solutions and the like.

Referring now to 54 of FIG. 2 and to FIG. 3, one embodiment provides a representation of the first data element received from the contact 108. FIG. 3 is an example of a user interface 100 displayed on display 12 of FIG. 1 according to one embodiment of the present invention. User interface 100 represents an exemplary Unified Messaging™ display screen having a contact list 101 thereon. In addition, the display 100 of FIG. 3 includes graphical elements 122 and graphical elements 124 as well as navigation bar 102 and button bar 106 which are described in more detail herein.

With reference now to 56 of FIG. 2 and to FIG. 3, one embodiment couples the representation of the first data element with the contact 108 on a contact list 101. For example, user interface 100 associates graphical elements 122 with each name in the contact list 101. The graphical elements 122 identify, for each of names in the contact list 101, whether or not data elements have been received from the specific contact 108. For example, graphical elements 122 provide a visual cue that an email, text message, voice message, and the like have been received from a contact 108. In another embodiment, the graphical elements 122 may be an audio element for providing an audio cue. In other words, the graphical elements 122 may be easily modifiable for different users or user's needs without adversely affecting the operation of the graphical elements 122.

In another embodiment, the graphical elements 122 also represent other received data elements such as, email, mobile phone number, business phone number and the like which have been received for the specific client. For example, if a business phone number may be available for a contact 108, then the appropriate element indicating this may be displayed next to the contact's name. Similarly, if an email address may be available for a contact 108, then the appropriate element indicating this may be displayed next to the contact's name.

Referring now to 58 of FIG. 2 and to FIG. 3, one embodiment receives a second data element from the contact 108. In one embodiment, the second data element includes data such as an email, instant message (IM), short message service (SMS), text message, web access, voice mail, address book, calendar, tasks, notes, BOT buddies, pages and the like.

With reference now to 60 of FIG. 2, one embodiment provides a representation of the second data element received from the contact 108.

Referring now to 62 of FIG. 2 and to FIG. 3, one embodiment couples the representation of the second data element with the contact 108 on the contact list 101, such that the representation of the first data element and the representation of the second data element are concurrently integrated with the contact 108 on the contact list 101. In one embodiment, a single user operation, such as a mouse click, touch of the screen, selection with a stylus, and the like may be used to provide access to the first data element or the second data element.

Graphical elements 124 of user interface 100 indicate the number of messages received from a contact 108 in the contact list 101. The graphical elements 124 may be aligned with the type of communication method that was used to generate the message. In the example of FIG. 3, the contact 108 named "Aggarwal, Saura" has sent five (5) email messages, and the contact 108 named "Edwards, John" has sent two (2) email messages and left (2) voicemail messages.

In one embodiment, user customizable options are provided for modifying an order in which the first representation and the second representation will be coupled with the contact 108. In other words, graphical elements 122 and graphical elements 124 are modifiable based on user preference and the like without detrimentally affecting their operational characteristics.

In another embodiment, a plurality of application tabs may be provided in conjunction with the contact list 101. In addition, the first representation and the second representation are sorted within the appropriate application tab to provide navigation between pluralities of applications. In one embodiment, the sorting of the plurality of application tabs may be performed automatically based on application utilization, wherein a frequently used application will have a tab at a first end and a rarely used application will have a tab at a second end. In another embodiment, the plurality of application tabs are customizing based on user selected preference.

Figure 4:
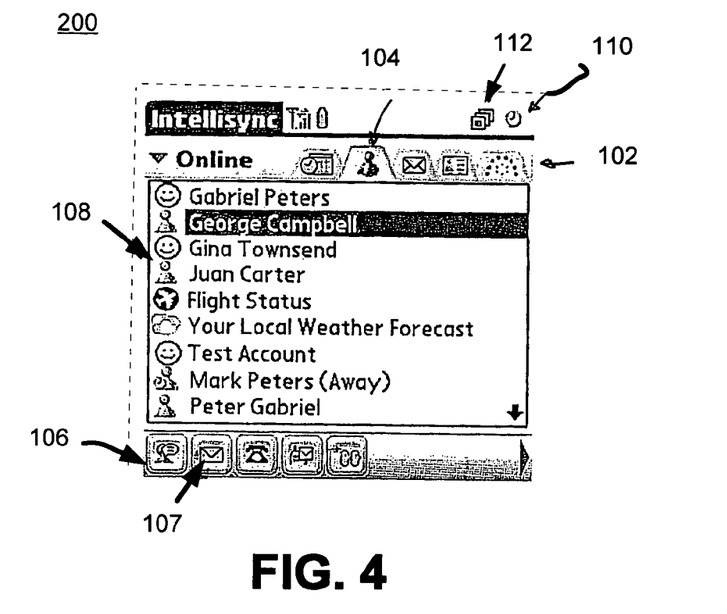
FIG. 4 is an exemplary user interface having a contact status with the list according to one embodiment of the present invention.

For example, with reference now to FIG. 4, user interface 200 includes a navigation bar 102 that includes a number of graphically rendered "tabs" exemplified by tab 104. The tabs in navigation bar 102 correspond to the various types of display screens that can be presented to a user. For example, in addition to the IM display screen, there are display screens for email, for a list of contacts (e.g., an address book), and for various applications (such as but not limited to date book, address book, email, IM and phone applications). By selecting a tab with, for example, a stylus, the corresponding display screen may be revealed. By selecting tab 104, for example, the display screen 200 for the IM view may be presented.

User interface 200 also includes a button bar 106. Button bar 106 includes a number of graphically rendered buttons exemplified by button 107. The buttons 107 in button bar 106 can be used, for example, to access different communication methods, to edit the address book, etc. Hence, in various embodiments, button bar 106 provides buttons 107 corresponding to various user-initiated operations. In one embodiment, button bar 106 may be customizable and context-sensitive. In other words, a user can specify which buttons 107 should be included in button bar 106. Also, in one embodiment, the buttons displayed in button bar 106 can change from display screen to the next. Thus, for example, the buttons in button bar 106 for an IM display screen may be different from the buttons for an address book display screen.

For example, contact list 101 includes the names of human contacts as well as the names of "bots" ("bot" is short for IM robot, a pseudo IM buddy or contact 108 that provides a command line interface to a utility or some content, over the IM protocol). Bots provide instant access to specialized information such as stock quotes, whether, industry news, sports updates or any other information a user deems to be important. Users define bots in much the same way they define contacts, providing them with access to preferred information simply by selecting a bot from within the contact list 101. When a user sends a query instant message to a bot, the bot responds immediately with the information, communicating with the user like an "online chat buddy." Using bots, users can create shortcuts to specific queries for commonly accessed tools and information.

In another embodiment, user interface 200 also includes an icon indicating the presence 110 status of the user of the device, allowing the user to view the presence status as exposed to the user's contacts, and also allowing the user to set or change the presence 110 status. User interface 200 can also include an icon 112 that provides access to the list of sessions currently underway, using any of the communication methods that may be available to the user (e.g., IM, email, etc.). Further discussion of the presence 110 status will be provided in detail herein.

Figure 5:
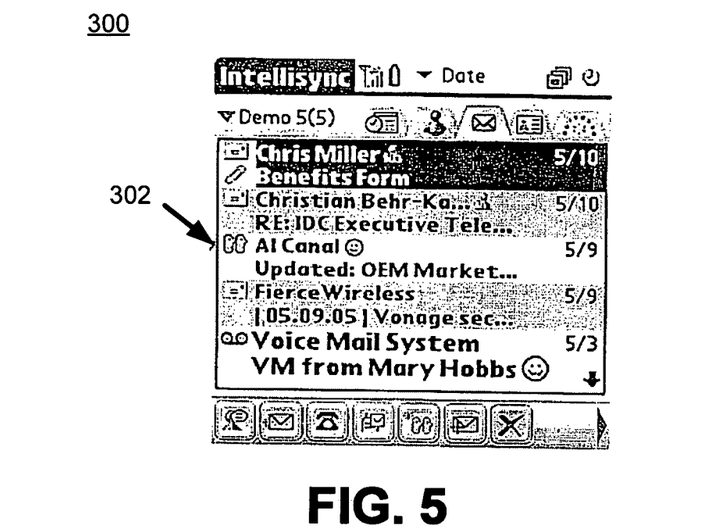
FIG. 5 is an exemplary user interface accessing a data element list associated with a contact according to one embodiment of the present invention.

Referring now to FIG. 5, another example of a user interface 300 is shown according to one embodiment of the present invention. User interface 300 represents a message (e.g., email and voicemail) view of a Unified Messaging™ display screen. In the example of FIG. 5, user interface 300 includes some of the same elements described above in conjunction with FIGS. 3 and 4. However, in the example of FIG. 5, user interface 300 is directed toward a list 302 of email messages and voicemail messages. Furthermore, user interface 300 includes presence 110 information for each message sender. The presence 110 information may be maintained up-to-date (in other words, the presence 110 information may be current versus a reflection of presence 110 status at the time the message was received). Presence 110 information is further described in the presence 110 information section herein.

Figure 6:
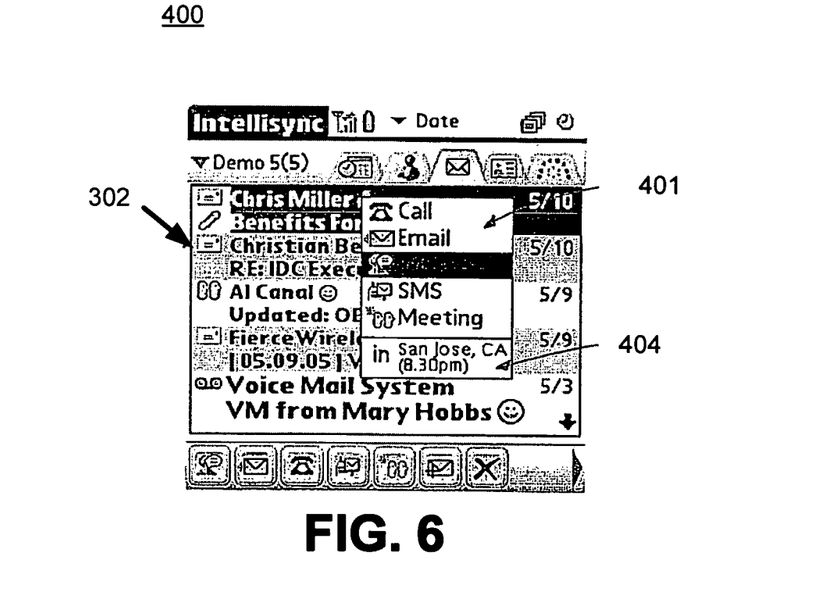
FIG. 6 is an exemplary user interface showing contact response options according to one embodiment of the present invention.

With reference now to FIG. 6, an example of a user interface 400 is shown according to yet another embodiment of the present invention. In the example of FIG. 6, user interface 400 includes some of the same elements described above in conjunction with FIGS. 3 and 4. However, in the example of FIG. 6, user interface 400 provides a message (e.g., email and voicemail) view of a Unified Messaging™ display screen, similar to the user interface 300 of FIG. 5. Furthermore, the user interface 400 includes presence 110 information for each message sender.

In the example of FIG. 6, a window 401 may be displayed as a result of user selection of one of the messages in the list 302. In other words, by selecting a message with, for example, a stylus, the window 401 may be displayed. Window 401 displays the various types of communication methods available for communicating with the sender of the selected message. For example, the message sender can be reached by phone (using a business phone number), email, IM, or SMS (in FIG. 6, IM is selected). The window 401 also includes information 404 indicating information derived from the calendar of the message sender, showing for example the location of the message sender or whether the sender is in a meeting.

The communications methods window 401 may be also available in other windows such as the contact list 101 display of FIG. 3. In addition, the displayed information 404 about the contact 108 can be derived from, for example, the contact's calendar, in a manner similar to that described above in conjunction with FIG. 3. For example, in one embodiment, the window 401 may be revealed in FIG. 3 by selecting a contact 108 in the contact list 101 with, for example, a stylus, a finger, or the like.

Thus, the user interfaces of FIGS. 3-6 each provide, in a single screen, data information for each contact 108 shown in the screen, and also the type of communication method(s) that can be used with each contact 108. In one view, e.g., 200 of FIG. 4, the user can see how many emails, voicemails, and SMS messages they have from a particular contact 108 and access them easily. The users' address, phone number, and instant messaging ID, for example, are available to be used instantly if needed. Thus, the data collection makes it very simple to engage with others.

In another embodiment, data elements that are sent to a contact 108 from the user are also coupled with the contact 108. For example, a graphic element 122 or 125 of FIG. 3 could be a representation of a sent data element. In addition, access to the sent data element may be performed by selecting the representation coupled with the sent data in a manner similar to that described in FIGS. 3-6. In one embodiment, a single user operation, such as a mouse click, touch of the screen, selection with a stylus, and the like may be used to provide access to the sent data elements.

Presence Overview

Unified Messaging™ also provides an additional capability referred to herein as "presence." Basically, the user not only has access to the user's contacts via a messaging methodology of the user's choice as described in the Unified Messaging™ section, but the application can also recommend which way to communicate with others based on the user's or the contacts preferred communications method. Additionally, the user can also configure their presence 110, giving the user control over the information flowing to and from the mobile device 10.

In one embodiment, the presence 110 information includes information such as a contact's location, a time at the contact's location, a status of the contact 108, an availability of the contact 108, a best method for contacting the contact 108 and the like. For example, a user may be in a sales meeting and would prefer that their manager contact them discreetly via text message to discuss pricing, rather than by a voice call. The user in the meeting can set their presence 110 status such that the manager will be informed to contact them via text message.

Using a popup window (such as window 401 of FIG. 6), a type of communication method can be selected to initiate further communication with a contact 108. The presence 110 information and the type of communication methods available for a contact 108 are updated dynamically at intervals of time. Thus, for example, if a contact 108 may be available via IM, then a graphical element indicating that information may be displayed next to the contact's name, and selection of the contact's name will open a window 401 that lists IM as an available communication option. Should the contact 108 sign off of IM, then the aforementioned graphical element will no longer appear next to the contact's name, and the list of available communication options will no longer include IM.

Because presence 110 information may be included in each of the user interface screens, the user may be provided with feedback as a guide for follow-on communications, reducing inefficiencies. For example, presence 110 information informs users when other users are available and willing to communicate. By integrating presence 110 services with email, calendar and contact 108 information, contacts automatically know that the user may be in a meeting, traveling, asleep, available, when the user will be available, or the like.

This capability may be further augmented by enabling users to set their personal communications preferences, thereby defining how and when people can most effectively reach them. For example, if a user is in a meeting, text messaging may be user selected as the method for contact in the presence 110 information. In another embodiment, the method for contact may be automatically selected. For example, the presence 110 may be based on a user's calendar, a standard day/time setting, or other automated methods.

From a user perspective, this "presence 110 service" not only has access to, for example, their business colleagues via any messaging methodology they choose on their device screen, but the application can also recommend the best way to communicate with others based on their preferred communication method at that specific time. In one embodiment, the recommendation may be based on user-specified preferences. In another embodiment, the recommendation may be based on user-specified preferences, and may be also derived by learning the user's preferences based on past selections of communication methods.

For example, if the user generally communicates with a particular person via email, then the present invention application may learn this and automatically recommend email as a first choice the next time that person is to be contacted. The user can also specify how they want to be communicated with, giving them control over the information flowing to their mobile device.

Furthermore, one type of communication method can readily be used to respond to a different type of communication method. For example, as illustrated in the example of FIG. 6, IM can be readily used to respond to an email message. In addition, since the user interface may be consistent across different views. This, along with "one touch" access, facilitates adoption by mobile users and increases productivity.

Presence Operation

Figure 7:
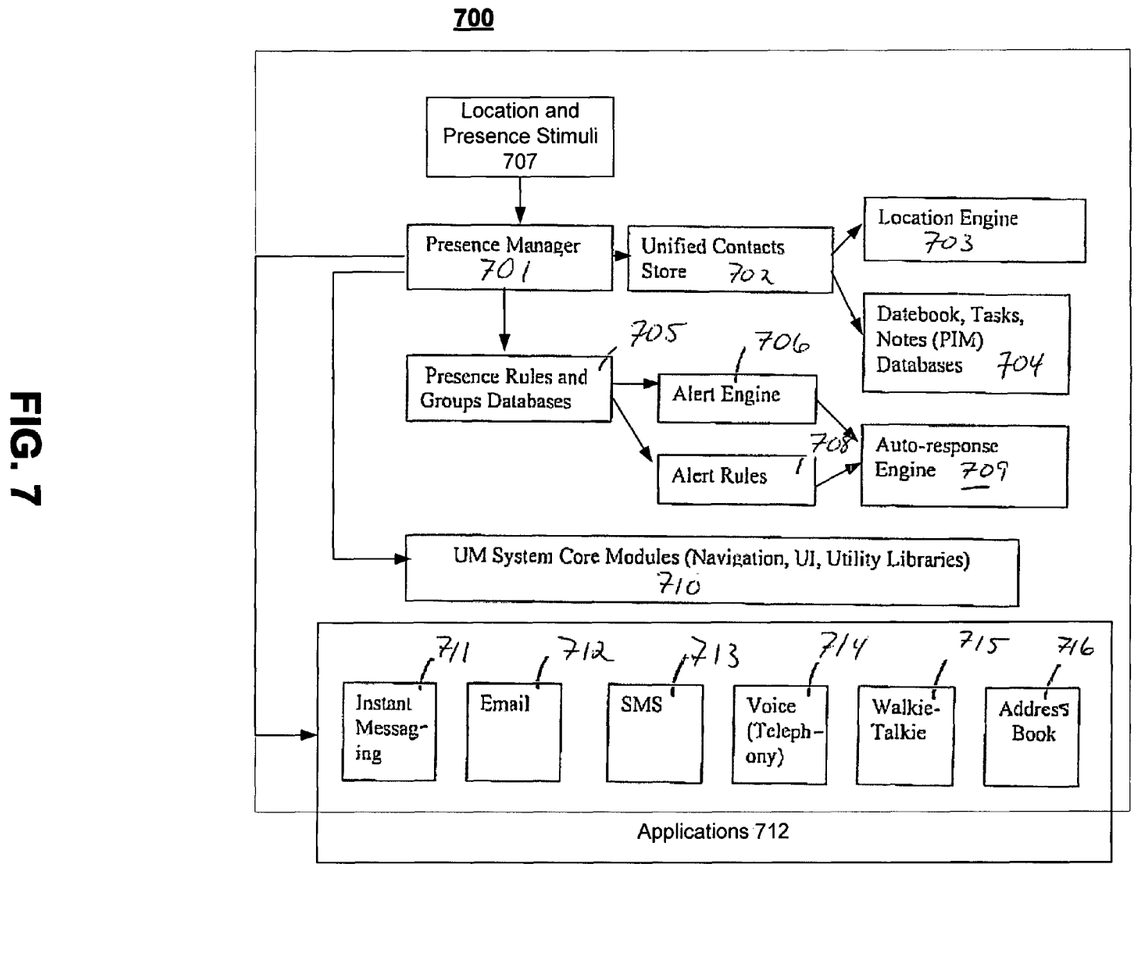
FIG. 7 is a block diagram of a system for maintaining presence status according to an embodiment of the present invention.

With reference now to FIG. 7, a block diagram of a system 700 for maintaining presence 110 status may be shown in accordance with one embodiment of the present invention. In general, system 700 includes a Presence Manager 701, a unified contacts store 702, a locations engine 703, databases 704 for applications such as a datebook, databases 705 for presence rules and groups, an alert engine 706, alert rules 708, an auto-response engine 709, Unified Messaging™ (UM) system core modules 710, and UM applications such as IM 711, email 712, SMS 713, voice (telephony) 714, walkie-talkie 715 and address book 716. System 700 receives location and presence stimuli 707 as an input.

For example, in one embodiment, presence device 700 receives state of the alert mechanisms, which may include an LED, a vibrator, a display and/or a ringer. Alert engine 706 also receives alert rules 708 and information including the type of communication, contact information, and the output from the presence engine. Alert engine 706 provides alert stimulus to the alert mechanisms.

In one embodiment, alert rules 708 may be specified as follows. A conjunction of conditions can imply an alert stimulus for each one of the available alert mechanisms. A conjunction can be expressed in terms of contacts, type of communication, time since a most recent communication, presence engine output, time of day and location. A presence rule set can imply a specified alert rule. A repeat and fading rule set specifies how an alert should be repeated and how the repeat interval should vary with time. A set of templates can be pre-defined for important common scenarios.

Alert rules 708 can also group a user's contacts into "presence groups," for the purpose of doing automatic presence 110 management. In one embodiment, the presence groups may be orthogonal to other ways of grouping a user's contacts, e.g., categories such as "Business", "Personal", etc., which serve as organization and visual search aids in many address book implementations. In another embodiment, the categories themselves can be the same as the system's presence groups. Moreover, a presence group can be as large as the set of all of a user's contacts, or as small as a single individual contact 108.

For example, a modified address book may be implemented that can define and manipulate presence groups and related information, and can move a user in and out of presence groups. The fundamental idea behind presence groups may be to group a user's contacts into classes based on the user's relations with them, and the nature of the user's communication with them. For example, a user may want to be always available "instantly" to immediate family, be always available during the workday to the boss(es), but be available to co-workers only when not in meetings, and available to friends and extended family, only after work hours (and not during sleep-time) or on weekends.

Grouping of Contacts in Presence Operation

Alert rules 708 may also group a user's contacts into transient "activity groups," and maintain this association with ongoing communication. Unlike presence groups, which are more permanent and reflect a user's relationship with a contact 108, an activity group may be a division of people who communicate with the user based on how often and how recently they have communicated with the user. For example, a user's contacts may be grouped into two activity groups: "active," which consists of all contacts with whom the user has communicated in the last 24 hours, and "passive," which may be the set of all other contacts.

The grouping of users into activity groups may be more dynamic than the grouping into presence groups, and contacts flow in and out of the activity groups based on ongoing communication. Activity groups allow a user to specify accept policies and alert actions such that, for example, a contact 108 communicating with the user after a year does not cause a alert when the user may be "busy" in some meeting, but if the user has been in touch very recently with this contact 108, the user may be alerted appropriately. The notion of activity groups deals with a plurality of dynamic issues such as, the nature of a user's communications with contacts can change with time, and the expectation of users that an intelligent machine (like a handheld) will learn from their habits.

For example, a user may desire that an email from a co-worker should generally not alert him during a meeting. However, if during the meeting itself, the user had written to this contact 108 asking for some information, then the reply from that co-worker should alert the user (perhaps with a silent vibration). The present Presence Management System dynamically creates an activity group when the user emails, etc., someone during a meeting. If that person now communicates back with the user, their communication request may be dealt with per the newly created activity group's policies and alerts.

In one embodiment, the presence Manager 701 places a user (a contact 108) in an activity group. After an amount of time 'T' has passed, the user may be removed from the activity group. In one embodiment, 'T' may be computed as 'D' times the standard deviation of the mean time between separate incidents of communication with the contact 108. In one particular embodiment, 'D' is 4. The value of 'D' can be tuned for performance depending on the usage pattern.

To maintain presence groups, in one embodiment, a user manually divides up contacts into groups such as family, co-workers, executives, customers, etc., depending on user preference. Presence group information can be serialized and then shared with, for example, co-workers that have access to a similar address book (e.g., a corporate address book). In one embodiment, a serialization method can be implemented using Extensible Markup Language (XML) or other data formats (standard or nonstandard).

Moreover, presence manager 701 may include a set of mechanisms to maintain and advertise a true presence 110 status for each one of the user's presence groups. For example, presence manager 701 may allow a user to appear "Available" to presence group #1 ("Family") and at the same time appear "Busy" to presence group #2 ("Co-Workers"), while appearing "Away" to yet a third presence group. Thus, a user can selectively pick and choose what feedback he or she wishes to send to different people in the contact list 101 at any, or a plurality of, point(s) of time.

Presence manager 701 may also include a set of mechanisms to allow a user to specify policies that determine how a user's true presence 110 may be automatically adjusted for each presence group in response to a number of dynamically changing circumstances. These changing circumstances incorporate the state of the user's calendar/datebook, the user's relative location and the user's absolute location.

Additionally, presence manager 701 may include a set of mechanisms to specify one or more prioritized accept policies which tie incoming communication requests based on the nature of the incoming communication (e.g., email versus SMS versus voice), the originator of the incoming communication, the presence group to which the originator belongs, the true presence 110 state assigned to that presence group at that instant of time, and the activity group to which the originator belongs, to an alert action.

In yet another embodiment, presence manager 701 may also include a set of mechanisms to define an alert action, which allows a matching communication request to be rejected (with or without feedback to the user), optionally logged, or accepted and announced with a contact 108 specific or generic alert like a ring tone being played, an LED being flashed or the vibrator being activated, or any subset or combination of these.

Presence manager 701 may also include a set of mechanisms to enforce the accept policies and alert actions specified by a user for the various methods of communication. Thus, at an instance of time, the present invention Presence Manager may decide, based on an alert policy, to automatically send an incoming call to voicemail (or to a special voice recording), without the user's mobile phone even ringing. Similarly, a few seconds later, an incoming voice message or email from this user could be silently accepted without disturbing the user with an "alert" from the email program. Again, a few seconds later, an incoming call from a user that matches a different alert policy and action triggers a loud ringing sound.

A set of mechanisms to allow a user to see the presence 110 status of the user's contacts in a single view may also be include in presence manager 701. In one embodiment, the presence 110 status can serve as the default originating screen for all forms of communication.

With reference still to presence manager 701, a set of mechanisms by which a template of presence management rules and policies can be created and distributed among a large number of users may also be available. This may allow for the widespread adoption of automatic presence management without each user having to develop complex rules and policies from scratch.

For example, the presence rules 705 can be specified in the following manner. In one embodiment, a "presence 110 condition" may be an assertion that involves making a logical statement with the elements such as, but not limited to, defined places include named virtual places such as car, desktop; defined places include named fixed places such as home, office, an address; defined ranges include "within a specified distance of a defined place.

Moreover, time ranges can be specified for when a rule starts and ends taking effect; words in a date book; event description or identity of associated contacts can be elements of a rule; incoming communication events within a time-relative can be used as elements; a set of templates pre-defined for important common scenarios, and the like.

In one embodiment, a presence rule 705 may be a conjunction of conditions which imply a particular setting of the user's presence 110 (perhaps separately for each presence group).

Furthermore, the methodology for maintaining presence 110 settings may be implemented by Presence Manager 701 of FIG. 7. For example, presence manager 701 may receive input such as calendar states, presence 110 rules, location and time of day (including time zone) information, and outputs presence 110 settings for different presence groups.

Figure 8:
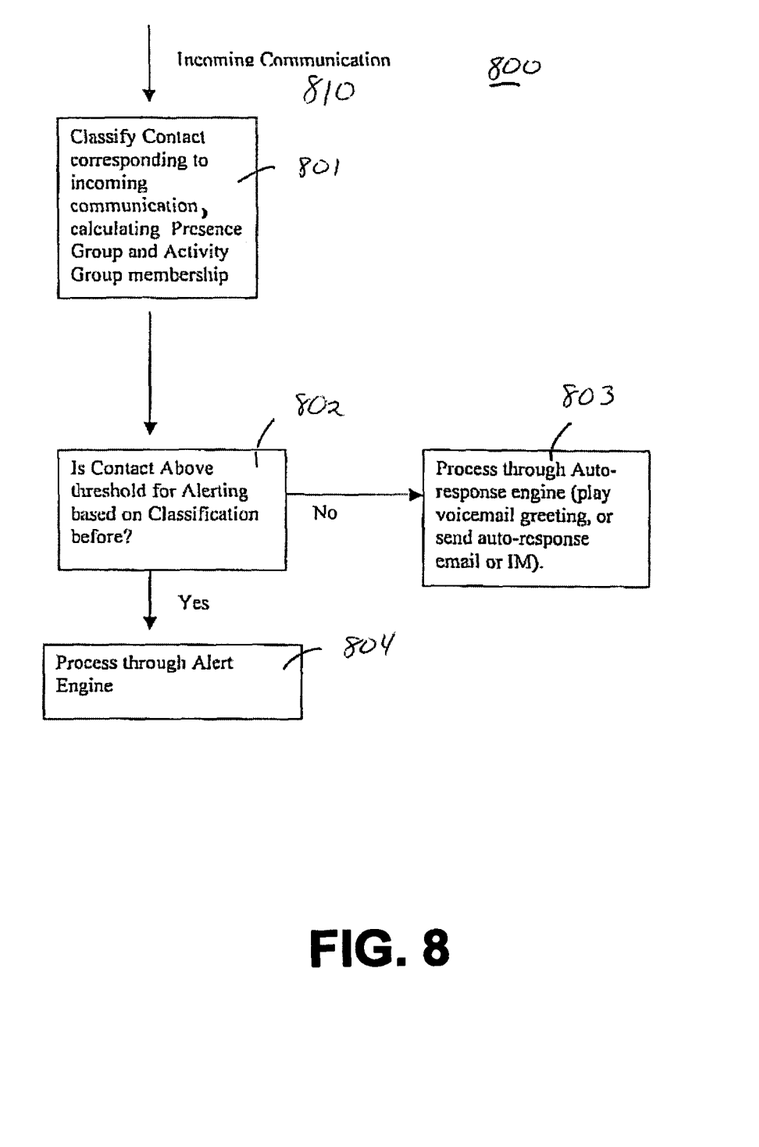
FIG. 8 is a flowchart of a method for handling an incoming communication according to an embodiment of the present invention.

Referring now to FIG. 8, a flowchart 800 of a method for handling an incoming communication may be shown in accordance with one embodiment of the present invention. In one embodiment, flowchart 800 may be implemented by Presence Manager 701 of FIG. 7.

With reference now to block 801 of FIG. 8, a contact 108 corresponding to an incoming communication 810 may be classified by calculating presence group and activity group membership. In block 802, a determination may be made as to whether or not the contact 108 satisfies an alert threshold. If not, the incoming communication 810 may be processed through the auto-response engine 803. For example, a voice-mail greeting may be played, or an auto-response may be sent via email or IM.

However, if the contact 108 satisfies the alert threshold, then the incoming communication may be processed through alert engine 804.

Propagation and Distribution of Presence Status Overview

In the following section, embodiments address the distribution of presence 110 status information (updates) for a large number of individuals to a handheld device. For example, frequent or continuous updates of the presence 110 status of the various other users contained in a user's list of contacts consume bandwidth on the wireless data channel, and also consume battery life. Use of the data channel for updates may also prevent voice calls from being received while the updates are taking place. For this reason, one embodiment utilizes a set of techniques to efficiently propagate continuous or frequent presence 110 updates of a large population to a wireless device.

Propagation and Distribution of Presence Status Operation

Figure 9:
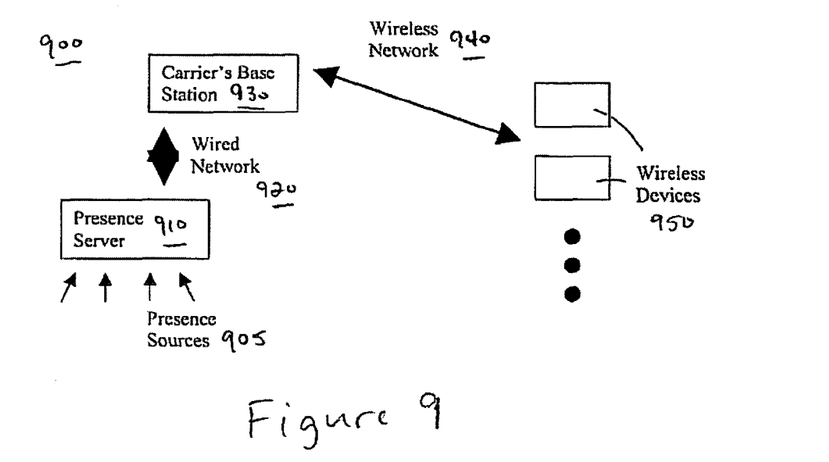
FIG. 9 is a block diagram of a system for distributing presence status information according to one embodiment of the present invention.

With reference now to FIG. 9, a block diagram of a system 900 for distributing presence 110 status information may be shown in accordance with one embodiment of the present invention. In the example of FIG. 9, system 900 includes a number of presence sources 905 in communication with a presence server 910 that may be linked by wired network 920 to a carrier base station 930 and a wireless network 940 that links the carrier base station 930 and a number of wireless devices 950.

In the present embodiment, presence server 910 exists on the wired side of the system 900. The wireless devices 950 connect to the presence server 910 via a carrier's wireless network 940. The presence server 910 receives updates from the target population (presence sources 905).

Furthermore, each wireless device 950 may have a module referred to herein as a "presence client." The presence client may be part of the software that may be responsible for receiving presence 110 updates from the presence server 910.

In general, the presence client operates in a plurality of manners. The following description is merely one of the plurality of operational methods. Initially, a wireless device 950 and the presence server 910 exchange a target contact list 101, whose presence 110 updates are to be propagated. This target list may be sorted according to, for example, an order of importance of the contacts.

The sorted target list may be further subdivided into 'N' groups and tagged in order of relative importance. Each group may then be assigned an update frequency, based on the importance of the group. Moreover, each presence group may be identified by a numeric identifier (ID) 'G,' which may be represented using 'X' bits, where X=log to base 2 (Total Number of Groups). In addition, each contact 108 may be identified by a numeric identifier 'C,' which may be relative to its group. The identifier 'C' may be represented using 'Y' bits, where Y=log to base 2 (Number of Presence 110 States). Both the presence server 910 and the wireless device 950 may share information about groups and contacts, the group IDs and the number of bits used to represent the group IDs, presence 110 updates for contacts within a group, and the number of contact IDs within each Group.

In one embodiment, two modes of operating the wireless device 950 are defined, referred to herein as an "Active Mode" and a "Standby Mode." In the Active Mode, the user may be provided the opportunity to see all presence 110 updates for all contacts in real time. The Active Mode can be used when the user may be actually communicating back and forth with a contact 108 using the data channel. In the Standby Mode, the user may be not actively communicating with a contact 108 using the data channel. In Standby Mode, presence 110 updates are transmitted from the server 910 to the wireless device 950 using a restricted, prioritized method, an embodiment of which is described below.

During operation, presence 110 updates may be delivered as follows. In active mode, each presence 110 update may be transmitted from the presence server 910. In standby mode, for a group 'G' associated with a presence client, the presence client polls the server 910 every 'U' seconds, where 'U' may be the update time specified for the group 'G.'

In one embodiment, the encoded update is as follows:

G-bits, B_1 bits, B_2 bits, . . . , B_n bits.

Thus, a compressed and efficient representation of the presence 110 update for Group 'G' can be provided. For example, if 'G' has 16 members, and four (4) Presence States, a Group Presence 110 update fits within 36 bits. If there are 10 such groups, the update may be compressed to 360 bits, or 45 bytes.

The above embodiment assumes a binary bitwise representation of IDs. For larger populations, which may have a large variation in the relative importance of groups, a dictionary-based scheme that uses a smaller number of bits for higher priority groups can be used. Moreover, many other compression methods may be utilized. The description of the compression methods herein is merely for purposes of brevity and clarity.

Furthermore, the methods described above can be used with many different approaches for partitioning the target contact list 101 into groups. For example, contacts are initially evenly divided (randomly) into 'H' groups, where 'H' is a small number (e.g., 'H' represents 16 Contacts). The frequency of communication with the various contacts may be tracked, and this information may be used to sort Contacts with a similar frequency of communication into a same group. Groups are sorted by their "frequency of communication" index.

In one embodiment, the frequency of communication may be used for determining the activity groups. For example, embodiments track the number of times the user has sent and/or received messages, calls, files, communication requests and the like from at least one of the contacts in the contact list or from a previously un-stored contact. Based on the tracked times, one embodiment determines the frequency of communication, the user has with a particular contact. One exemplary way is to determine an index for the frequency of communication such that those contacts that the user has had communication relatively frequently, e.g., within a certain time period such as a week, will have a first index value, and other contacts that the user communicates with daily will have a second index value.

Although the index values are time based in one example, the index values are not required to be time based. For example, the user's contacts may be divided into activity groups based on index values such as the last 10 (or any number) communicated contacts have a first index value and the next 10 have a second index value, etc.

In one embodiment, the determining of the index value and the assigning of a user's contact into an activity group may be performed in a number of ways. For example, the determining of the index value (e.g., based on number of times of communication, etc.) may happen automatically in the background during normal operation of the device. However, in another embodiment, the determining of the index value (e.g., based on number of times of communication, etc.) may happen manually. That is, the user may manually select the option to determine the index value.

Furthermore, the assignment of a user's contact to a new or previously created activity group may also be performed automatically in the background during normal operation of the device. However, in another embodiment, the assignment of a user's contact to a new or previously created activity group may happen manually. That is, the user may manually select the option to assign the contact to a new or previously created activity group. Thus, the determining of the index value and the assignment of a contact to an activity group could occur automatically in the background, manually in the foreground, or a combination of automatically in the background and manually in the foreground.

Once activity groups are established, similar or different actions could then be performed on the activity groups. For example, the activity group with which the user communicates more frequently is held more important than an activity group with which the user communicates less frequently. In one embodiment, a threshold value may be automatically defined or it may be user-defined and incoming or outgoing communications may be performed based on the threshold. For example, an incoming call from a contact belonging to an infrequent activity group (e.g., a group below the threshold to whose calls are announced at the device) is directed to an answering service or a message option is shown to the contact. However, an incoming call from a contact belonging to a frequent activity group (e.g., a group above the threshold to whose calls are announced at the device) will be announced at the device and connected through to the device. Although calls are specified herein, the description herein is well suited to any type of received data element such as an email, instant message (IM), short message service (SMS), text message, web access, voice mail, address book, calendar, tasks, notes, BOT buddies, pages, corporate IM solutions and the like.

Figure 10:
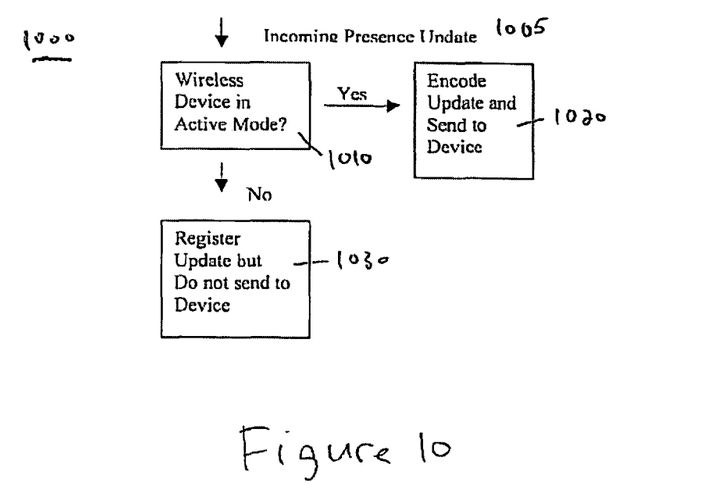
FIG. 10 is a flowchart of a method for distributing presence status information according to one embodiment of the present invention.

With reference now to FIG. 10, a flowchart 1000 of a method for distributing presence 110 status information may be shown in accordance with one embodiment of the present invention. FIG. 10 pertains to the server-side response to an incoming presence 110 update. In other words, in one embodiment, flowchart 100 may be implemented by presence server 910 of FIG. 9.

In block 1010 of FIG. 10, an incoming presence update 1005 may be received for a wireless device. At block 1010, if the device may be in Active Mode, then the update 1005 may be encoded and sent to the wireless device (block 1020). At block 1030, if the device is not in Active Mode, then the update 1005 may be updated but not sent to the device (block 1030).

Exemplary Computer System

Figure 11:
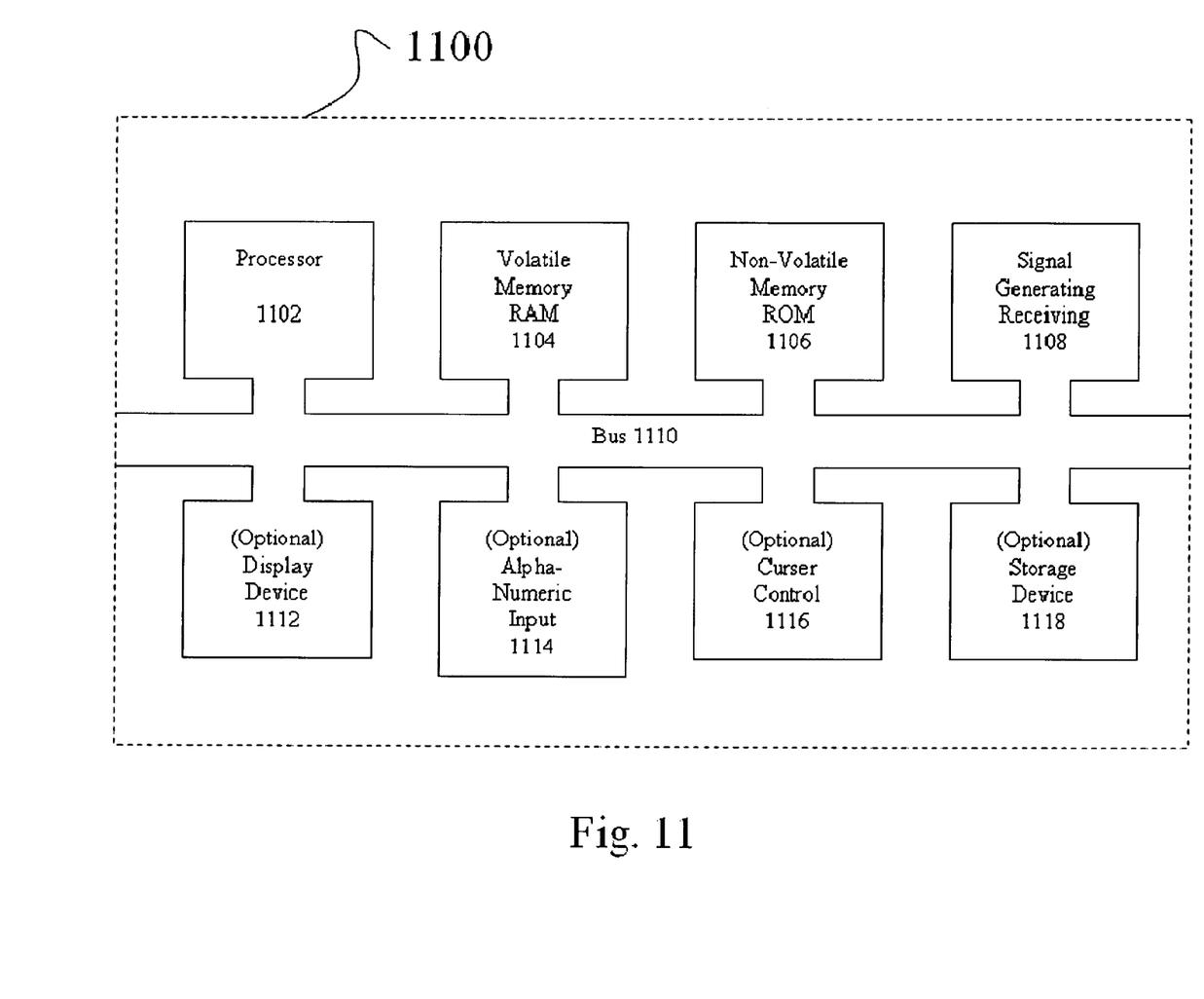
FIG. 11 is a block diagram of an exemplary computer system used in accordance with one embodiment of the present invention.

With reference now to FIG. 11, a block diagram of an embodiment of an exemplary computer system 1100 used in accordance with the present invention. For example, computer system 1100 may represent the wireless personal device 10 or the like. It should be appreciated that computing system 1100 is not strictly limited to be a computer system. As such, computing system 1100 of the present embodiment may be well suited to be any type of computing device (e.g., server computer, portable computing device, desktop computer, mobile phone, pager, personal digital assistant, etc.). Within the present discussions of the present invention, certain processes and steps are discussed that are realized, in one embodiment, as a series of instructions (e.g., software program) that reside within computer readable memory units of mobile device 10 and executed by a processor(s) of computing system 1100. When executed, the instructions cause computer system 1100 to perform specific actions and exhibit specific behavior that may be described in detail herein.

Computer system 1100 of FIG. 11 comprises an address/data bus 1110 for communicating information, one or more central processors 1102 coupled with bus 1110 for processing information and instructions. Central processor unit(s) 1102 may be a microprocessor or any other type of processor. The computer system 1100 also includes data storage features such as a computer usable volatile memory unit 1104 (e.g., random access memory, static RAM, dynamic RAM, etc.) coupled with bus 1110 for storing information and instructions for central processor(s) 1102, a computer usable non-volatile memory unit 1106 (e.g., read only memory, programmable ROM, flash memory, EPROM, EEPROM, etc.) coupled with bus 1110 for storing static information and instructions for processor(s) 1102. Computer system 1100 also includes one or more signal generating and receiving devices 1108 coupled with bus 1110 for enabling computer system 1100 to interface with other electronic devices and computer systems. The communication interface(s) 1108 of the present embodiment may include wired and/or wireless communication technology.

Optionally, computer system 1100 may include an alphanumeric input device 1114 including alphanumeric and function keys coupled to the bus 1110 for communicating information and command selections to the central processor(s) 1102. The computer system 1100 can include an optional cursor control or cursor directing device 1116 coupled to the bus 1110 for communicating user input information and command selections to the central processor(s) 1102. The cursor-directing device 1116 may be implemented using a number of well-known devices such as a mouse, a track-ball, a track-pad, an optical tracking device, and a touch screen, among others. Alternatively, it may be appreciated that a cursor may be directed and/or activated via input from the alphanumeric input device 1114 using special keys and key sequence commands. The present embodiment is also well suited to directing a cursor by other means such as, for example, voice commands.

The computing system 1100 of FIG. 11 may also include one or more optional computer usable data storage devices 1118 such as a magnetic or optical disk and disk drive (e.g., hard drive or floppy diskette) coupled with bus 1110 for storing information and instructions. An optional display device 1112 may be coupled to bus 1110 of computing system 1100 for displaying video and/or graphics. It should be appreciated that optional display device 1112 may be a cathode ray tube (CRT), flat panel liquid crystal display (LCD), field emission display (FED), plasma display or any other display device suitable for displaying video and/or graphic images and alphanumeric characters recognizable to a user.

Thus, as described herein, Unified Messaging™ can be used with a broad range of mobile data device environments such as mobile networks, a plurality of operating systems, and the like. Additionally, the email application implemented using the Unified Messaging™ platform can be operated in conjunction with any emailing applications. The system also supports industry standard communications protocols. The text messaging client implemented using the Unified Messaging™ platform supports all consumer text messaging platforms including corporate IM solutions.

Furthermore, applications can be synchronized wirelessly with information residing on the user's PC or on a corporate server. Thus, mobile persons can access information from their messaging applications, with assurance that the information may be synchronized with the wired world.

Moreover, the present embodiments provide a method and system for integrating data with a contact 108. In addition, embodiments described herein provide a method and system for integrating data with a contact 108 which provides a notion of generalized "true presence," which generalizes the traditional notion of presence 110 by making it: more fine-grained; more closely reflective of the user's real-world state, availability for external communication, and intentions at different times; and applicable to different manners of "instant" communications (e.g., voice, email, SMS etc) and not just IM.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    determining to present a graphical user interface including a contact list;
    providing a pictorial representation of a first data element, associated with a data communication, a data communication method or a combination thereof, received from a contact;
    coupling said pictorial representation of said first data element with said contact on said contact list;
    providing a pictorial representation of a second data element, associated with a data communication, a data communication method or a combination thereof, received from said contact;
    coupling said pictorial representation of said second data element with said contact on said contact list, such that said pictorial representation of said first data element and said pictorial representation of said second data element are concurrently integrated with said contact on said presented contact list; and
    providing user customizable options for modifying an order in which said pictorial representation of said first data element and said pictorial representation of said second data element are to be coupled with said contact.

2. The method of claim 1 further comprising:
    utilizing a single user operation to provide access to said first data element or said second data element.

3. The method of claim 1 further comprising:
    coupling a representation of a third data element sent to said contact on said contact list.

4. The method of claim 3 further comprising:
    utilizing a single user operation to provide access to said third data element.

5. The method of claim 1 wherein said first data element and said second data element are associated with email, instant message (IM), short message service (SMS), text message, web access, voice mail, address book, calendar, tasks, notes, BOT buddies and pages or a combination thereof.

6. The method of claim 1 further comprising:
    providing a plurality of application tabs in conjunction with said contact list; and
    sorting said pictorial representation of said first data element and said pictorial representation of said second data element within the appropriate application tab to provide navigation between a plurality of applications.

7. The method of claim 6 further comprising:
    sorting said plurality of application tabs automatically based on application utilization, wherein a frequently used application will have a tab at a first end and a rarely used application will have a tab at a second end.

8. The method of claim 6 further comprising:
    customizing said plurality of application tabs based on user selected preference.

9. The method of claim 1 further comprising:
    receiving presence-based information for at least one contact coupled with said contact list; and
    coupling said presence-based information with said contact on said contact list.

10. The method of claim 9 wherein said presence-based information is associated with a contact's location, a time at the contact's location, a status of the contact, an availability of the contact, a best method for contacting the contact or a combination thereof.

11. The method of claim 9 further comprising:
defining a contact's status;
defining a status threshold for said contact based on said status,
wherein a contact below said threshold will be directed to a message option and a contact above said threshold will be connected through to said user's mobile device; and
modifying said threshold based on a user's present context.

12. The method of claim 11 further comprising:
grouping contacts in said user's mobile device into at least two distinct categories; and
defining presence based information available to each of said grouping of contacts, wherein an activity group ranked below a relative importance group threshold will receive a minimum of said user status and an activity group ranked above said relative importance group threshold will receive all said user status information; and
modifying said group threshold defined by said threshold definer based on a user's present context.

13. An apparatus comprising:
at least one processor; and
at least one memory including computer program code for one or more programs,
the at least one memory and the computer program code configured to, with the at least one processor, cause the apparatus to perform at least the following:
determine to present a contact list on a graphical user interface,
provide a pictorial representation of a first data element, associated with a data communication, a data communication method or a combination thereof, received from a contact,
couple said pictorial representation of said first data element with said contact on said contact list,
provide a pictorial representation of a second data element, associated with a data communication, a data communication method or a combination thereof, received from said contact,
couple said pictorial representation of said second data element with said contact on said contact list, such that said pictorial representation of said first data element and said pictorial representation of said second data element are concurrently integrated with said contact on said presented contact list, and
provide user customizable options for modifying an order in which said pictorial representation of said first data element and said pictorial representation of said second data element are to be coupled with said contact.

14. The apparatus of claim 13 wherein a single user operation provides direct access to said received data element.

15. The apparatus of claim 13, wherein the apparatus is further caused to:
couple a pictorial representation of a third data element sent to said contact on said contact list.

16. The apparatus of claim 15 wherein a single user operation provides direct access to said third data element.

17. The apparatus of claim 13 wherein said first data element and said second data element are associated with email, instant message (IM), short message service (SMS), text message, web access, voice mail, address book, calendar, tasks, notes, BOT buddies and pages or a combination thereof.

18. The apparatus of claim 13, wherein the apparatus is further caused to:
provide a plurality of application tabs in conjunction with said contact list for navigation between a plurality of available applications.

19. The apparatus of claim 18, wherein the apparatus is further caused to:
sort said plurality of application tabs automatically based on application utilization, wherein a frequently used application will have a tab at a first end and a rarely used application will have a tab at a second end.

20. The apparatus of claim 18, wherein the apparatus is further caused to:
sort said plurality of application tabs with user customization based on user selected preference.

21. The apparatus of claim 13, wherein the apparatus is further caused to:
provide presence-based information for at least one contact coupled with said contact list.

22. The apparatus of claim 21 wherein said presence-based information is associated with a contact's location, a time at the contact's location, a status of the contact, an availability of the contact, a best method for contacting the contact or a combination thereof.

23. The apparatus of claim 13 wherein the apparatus is further caused to:
define a contact's status,
define a threshold, wherein a contact ranked below said threshold will be directed to a message option and a contact ranked above said threshold will be connected through to said user's mobile device, and
modify said threshold defined by said threshold definer based on a user's present context.

24. The apparatus of claim 23 wherein the apparatus is further caused to:
group contacts in said user's mobile device into at least two distinct categories, and
define presence based information available to each of said grouping of contacts, wherein a contact in a group ranked below a defined group threshold will be directed to a message option and a contact ranked above said a defined group threshold will be connected through to said user's mobile device, and
modify said group threshold defined by said threshold definer based on a user's present context.

25. A non-transitory computer-readable storage medium carrying one or more sequences of one or more instructions which, when executed by one or more processors, cause an apparatus to at least perform the following steps:
determining to present a graphical user interface including a contact list;
providing a pictorial representation of a first data element received from a contact;
coupling said pictorial representation of said first data element, associated with a data communication, a data communication method or a combination thereof, with said contact on said contact list;
providing a pictorial representation of a second data element received from said contact;
coupling said pictorial representation of said second data element, associated with a data communication, a data communication method or a combination thereof, with said contact on said contact list, wherein said pictorial representation of said first data element and said pictorial representation of said second data element are concurrently coupled with said contact on said presented contact list; and providing user customizable options for modifying an order in which said pictorial representation of said first data element and said pictorial representation of said second data element are to be coupled with said contact.

26. The non-transitory computer-readable storage medium of claim 25, wherein the apparatus is further caused to perform:
providing access to said received data element by selecting the pictorial representation coupled with said contact;
receiving contact presence-based information for said at least one contact on said contact list; and
providing contact presence-based information to said at least one contact on said contact list.

27. The non-transitory computer-readable storage medium of claim 25, wherein the apparatus is further caused to perform:
coupling a pictorial representation of a third data element sent to said contact on said contact list; and
utilizing a single user input to provide direct access to said sent messages by clicking on said pictorial representation of said sent data element coupled with said contact.

28. The non-transitory computer-readable storage medium of claim 25 wherein said first data element and said second data element are associated with email, instant message (IM), short message service (SMS), text message, web access, voice mail, address book, calendar, tasks, notes, BOT buddies and pages or a combination thereof.

29. The non-transitory computer-readable storage medium of claim 25, wherein the apparatus is further caused to perform:
providing a plurality of application tabs in conjunction with said contact list for navigation between a plurality of applications; and
sorting said plurality of application tabs automatically based on application utilization, wherein a frequently used application will have a tab at a first end and a rarely used application will have a tab at a second end.

30. The non-transitory computer-readable storage medium of claim 29, wherein the apparatus is further caused to perform:
sorting said plurality of application tabs with user customization based on user selected preference.

31. The non-transitory computer-readable storage medium of claim 26, wherein said presence-based information is selected from the group of information consisting of:
a contact's location, a time at the contact's location, a status of the contact, an availability of the contact, and a best method for contacting the contact.

32. The non-transitory computer-readable storage medium of claim 25, wherein said user presence-based information is selected from the group of user information including:
a user's location, current time at the user's location, a status of the user, an availability of the user, and a best method for contacting said user.

33. A method comprising:
determining, via at least one processor, a frequency of communications for a contact of a user in a list of a plurality of contacts;
generating, via the at least one processor, a frequency of communication index for said contacts; and
sorting, via the at least one processor, said contact into one of at least two activity groups, wherein the activity groups are categorized into different levels of activity corresponding to the frequency of communication index,
wherein the one of at least two activity groups include one or more entities who have communicated with the user based on how often and/or how recently the one or more entities have communicated with the user, and
wherein said sorting is based, at least in part, on said frequency of communication index,
randomly partitioning, via the at least one processor, the list of contacts into said at least two activity groups, wherein said contact is initially randomly assigned to said one of the activity groups;
sorting, via the at least one processor, said contact into another one of said activity groups based on said frequency of communications index.

34. The method of claim 33 further comprising:
tagging, via the at least one processor, said at least two activity groups in order of importance; and
assigning, via the at least one processor, an update frequency, based on the importance of each of said at least two activity groups.

35. The method of claim 34 further comprising:
defining a status threshold for at least one of said at least two activity groups based on said importance, wherein a first activity group below a importance threshold will be directed to a message option and a second activity group above said importance threshold will be connected through to a user's mobile device.

36. The method of claim 33 further comprising:
defining presence based information available to at least one of said at least two activity groups, wherein a first activity group ranked below a importance group threshold will be directed to a message option and a second activity group ranked above said importance group threshold will be connected through to a user's mobile device.

37. An apparatus comprising:
at least one processor; and
at least one memory including computer program code for one or more programs,
the at least one memory and the computer program code configured to, with the at least one processor, cause the apparatus to perform at least the following,
determine a frequency of communications for a contact of a user in a list of a plurality of contacts,
generate a frequency of communication index for said contacts,
sort said contact into one of at least two activity groups, wherein the activity groups are categorized into different levels of activity corresponding to the frequency of communication index,
wherein the one of at least two activity groups include one or more entities who have communicated with the user based on how often and/or how recently the one or more entities have communicated with the user,
wherein said sorting is based, at least in part, on said frequency of communication index,
randomly partition the list of contacts into at least two activity groups, wherein said at least one contact is initially randomly assigned to one of the activity groups, and
sort said contact into another one of said activity groups based on said frequency of communications index.

38. The apparatus of claim 37 wherein said at least two activity groups are tagged in order of importance.

39. The apparatus of claim 38 wherein an update frequency is assigned to each of said at least two activity groups based on the importance of each activity group.

40. The apparatus of claim 39 wherein a status threshold is defined for at least one of said at least two activity groups based on said importance, wherein a first activity group below a importance threshold will be directed to a message option and a second activity group above said importance threshold will be connected through to a user's mobile device.

41. The apparatus of claim 39 wherein an amount of presence based information is provided to at least one of said at least two activity groups, wherein a first activity group ranked below a importance group threshold will receive a minimum of presence based information and a second activity group ranked above said importance group threshold will receive all presence based information.

* * * * *